US007016315B2

(12) United States Patent
Armbruster et al.

(10) Patent No.: US 7,016,315 B2
(45) Date of Patent: Mar. 21, 2006

(54) TOKEN PASSING ARRANGEMENT FOR A CONFERENCE CALL BRIDGE ARRANGEMENT

(75) Inventors: Peter J. Armbruster, Chandler, AZ (US); Bradley R. Schaefer, Chandler, AZ (US); Mark L. Shaughnessy, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 938 days.

(21) Appl. No.: 09/817,388

(22) Filed: Mar. 26, 2001

(65) Prior Publication Data

US 2002/0136166 A1     Sep. 26, 2002

(51) Int. Cl.
 *H04L 12/16*   (2006.01)
 *H04L 11/00*   (2006.01)
(52) U.S. Cl. .................................... 370/260; 370/352
(58) Field of Classification Search ................ 370/352, 370/260, 261, 263, 266, 267
 See application file for complete search history.

(56) References Cited

U.S. PATENT DOCUMENTS

| 6,009,469 A | 12/1999 | Mattaway et al. |
| 6,175,871 B1 | 1/2001 | Schuster et al. |
| 6,487,196 B1 * | 11/2002 | Verthein et al. ............ 370/352 |
| 6,760,422 B1 * | 7/2004 | Kowal et al. .......... 379/202.01 |
| 6,771,639 B1 * | 8/2004 | Holden ........................ 370/352 |
| 2002/0085697 A1 * | 7/2002 | Simard et al. ........... 379/202.1 |

FOREIGN PATENT DOCUMENTS

| EP | 0 779 732 | 6/1997 |
| EP | 0 779 732 A2 | 6/1997 |

* cited by examiner

*Primary Examiner*—Chi Pham
*Assistant Examiner*—Blanche Wong
(74) *Attorney, Agent, or Firm*—Frank J. Bogacz; Kevin D. Wills

(57) ABSTRACT

A user terminal (10) using an internet protocol using session initiation protocol to interconnect a number of user terminals (11–13) in a conference call. A conference bridge (30) or user terminal (10) detects speech of one of the user terminals (203). A "babble" timer is started (207). The speaker is allowed to continuously speak until silence is detected (217) or until the "babble" timer timers out (211).

12 Claims, 4 Drawing Sheets

TOKEN PASSING ARRANGEMENT FOR A CONFERENCE CALL BRIDGE ARRANGEMENT

CROSS REFERENCE TO RELATED APPLICATIONS

The present application is related to copending U.S. patent application Ser. No. 09/819,020 being assigned to the same assignee as the present invention.

BACKGROUND OF THE INVENTION

The present invention pertains to teleconferencing arrangements and more particularly to conference call bridges in a voice over internet protocol environment.

Special telephony functions are provided by telephone operating companies or by teleconference facilitator companies. These companies provide the special service of teleconference facilitating by interconnecting three or more conference users in one common telephone call. As a result, each of the users is able to talk and to hear each of the other users. The number of total teleconference users may be quite high. In the internet protocol environment, bandwidths are typically very large compared to basic voice telephony. Voice data becomes almost incidental to the large packets of data carried on the internet. Therefore, voice over internet protocol (VoIP) enables the internet system to carry telephone traffic which typically requires far less data to be exchanged via the internet than does data packages of information.

Telephone operating companies or teleconference facilitator companies typically implement a teleconference arrangement by a conference bridge. This conference bridge includes a bank of varied codecs, converters, mixers and vocoders. Each particular user has a codec in his teleconference terminal and must be connected with a similar codec at the conference bridge arrangement in the teleconference facilitator's equipment. The conference users may have different and varied codecs, therefore the conference bridge must be capable of serving many different kinds of codec interfaces.

In typical conference calling arrangements, "long winded" speakers may monopolize the conference call. In other situations one of the conference callers may be speaking from a noisy environment. In such situations that speaker will monopolize the conference since the conference bridge will perceive that speaker as never going silent (stop talking) due to the high level of noise.

Also, quick detection of silence avoids the real time problems and computing power required to detect silence in conventional conference arrangements.

What is needed is a token passing arrangement for avoiding a monopolizing speaker or a noisy environment in a conference call bridge in a voice over internet protocol environment.

DESCRIPTION OF THE PREFERRED EMBODIMENT

In providing the present invention, session internet protocol (SIP) is used. SIP provides terminal capability negotiations and invitation to multicast conferences. Further, SIP provides the necessary protocol mechanisms so that the user terminals and any proxy servers can provide the following services: user location, user capabilities, terminal capability negotiation, and invitations to multicast conference.

Figure 1:
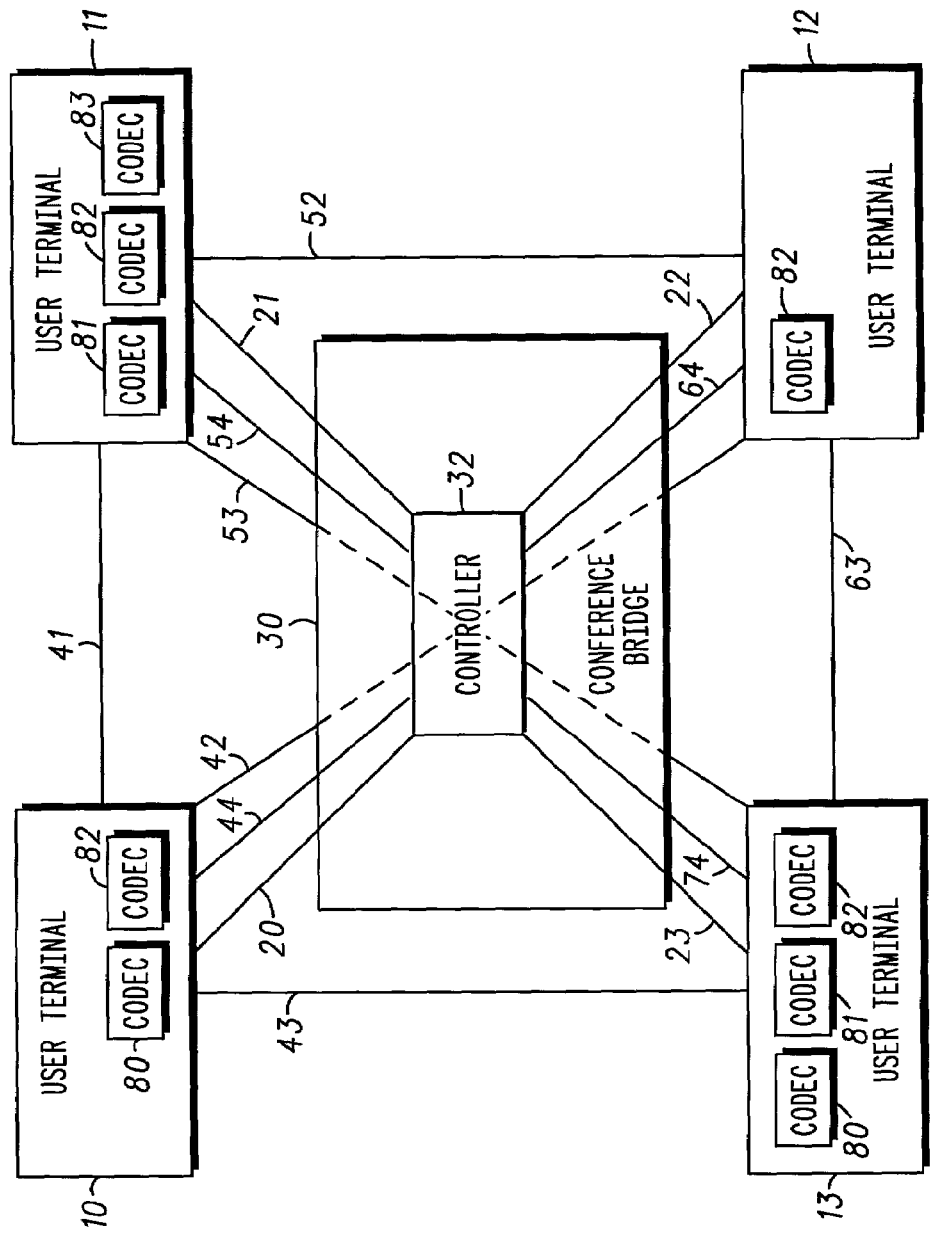
FIG. 1 is a block diagram of a conference call bridge arrangement using voice over internet protocol in accordance with the present invention.

FIG. 1 depicts a block diagram of a conference bridge arrangement according to the present invention. User terminals 10, 11, 12 and 13 are shown with data transfer interconnections 20, 21, 22 and 23 respectively connecting user terminals 10–13 to the controller 32 of conference bridge 30. Conference bridge 30 may be a voice packet switched bridge. These data transfer interconnections 20–23 are termed bearer traffic (voice data) interconnections. Similarly, each of the user terminals 10–13 are interconnected to the conference bridge 30 via signaling or control interconnections 44, 54, 64 and 74 respectively.

In conventional bridge arrangements, all signaling would be controlled by the conference bridge 30 via the signaling leads 44, 54, 64 and 74. As can be seen from FIG. 1, each of the user terminals (teleconference terminals) 10–13 has a different set of codecs 80–83 associated with the user terminal. The conventional conference bridge would be required to convert the data flow from each of the codecs 80–83; mix the information and separately vocode four different codecs before retransmitting the information for the conference call back to each of the user terminals 10–13. Such arrangement requires great processing power within the conference bridge. In an implementation of such a conference bridge, multiple signal processors (DSP) would be required at conference bridge 30 to perform these various functions.

In the present invention, each user terminal is also interconnected via a session initiation protocol (SIP) connection to each of the other user terminals in the conference. That is, for example, user terminal 10 is interconnected to user terminal 11 via interconnection 41; to user terminal 12 via interconnection 42, which is shown in a dashed line in part to indicate that there is no connection to bridge 30 or controller 32, and to user terminal 13 via interconnection 43.

Similarly, user terminal 11 is interconnected to user terminal 12 via interconnection 52; and to user terminal 13 via interconnection 53, which is shown in a dashed line in part to indicate that there is no connection to bridge 30 or controller 32. User terminal 12 is connected to user terminal 13 via interconnection 63.

A preferred embodiment of the present invention includes each user terminal 10–14 negotiating with the other user terminals directly via session initiation protocol and the internet to determine what compatible codec the terminals have with one another.

As an example, user terminal 10 originates the conference call and includes two codecs 80 and 82 while user terminal 11 includes three codecs 81, 82 and 83. As a result, user terminals 10 and 11 will negotiate the use of a codec by each of the terminals via internet interconnection 41. User terminals 10 and 11 may have many or only one codec in common. This particular common codec is codec 82 and will be selected between terminals 10 and 11.

User terminal 10 then will negotiate with user terminal 12 via internet interconnection 42. User terminal 12 includes only one codec 82. Therefore, the compatible codec of the user terminals 10 and 12 will be selected so that communication may be established between user terminals 10 and 12. This compatible codec is codec 82. If a different codec other than 82 was common between user terminals 10 and 12 this would mean that user terminal 10 must renegotiate use of the codec with user terminal 11 so as to establish a new common codec.

Similarly, user terminal 10 will negotiate selection of a codec via interconnection 43 with user terminal 13. In this example, user terminal 13 has a successful negotiation with user terminal 13 to codec 82. User terminal will not have to renegotiate the selection of a codec with the other user terminals 11 and 12. Again in this example, selection of an appropriate compatible codec could mean renegotiating the codec interconnections between user terminal 10 and user terminals 11 and 12. In this embodiment, user terminals 10 through 13 negotiate codecs to a "least common denominator" (LCD) codec. That is, a codec which will support communications between any of the user terminals 10–13. In this example, codec 82 met the criteria for LCD codec selection.

In another embodiment, the conference bridge may be asked to convert, mix and revocode certain data packets transmitted among the conference callers. Those data packets would be limited to those for users which have different codecs than the other users in the conference call. Therefore, this embodiment would support an arrangement in which each user terminal could speak in its native bearer format (codec translation) with the other conference callers. All packets would not have to be converted, mixed and revocoded; only the packets with those special user terminals having non-homogeneous bearer formats would be required to be thusly processed. This conversion and mixing may be done by one or more of the user terminals instead of the conference bridge.

The control of setting up the appropriate codecs for interfacing and negotiating to either a least common denominator codec or to codecs which are variable may be extended to add additional parties to the conference call. When each of the callers in the conference call has been suitably negotiated for a corresponding codec, the data flow is then established through the conventional conference bridge 30 to each of the data ports of the user terminals 10–13.

Figure 2:
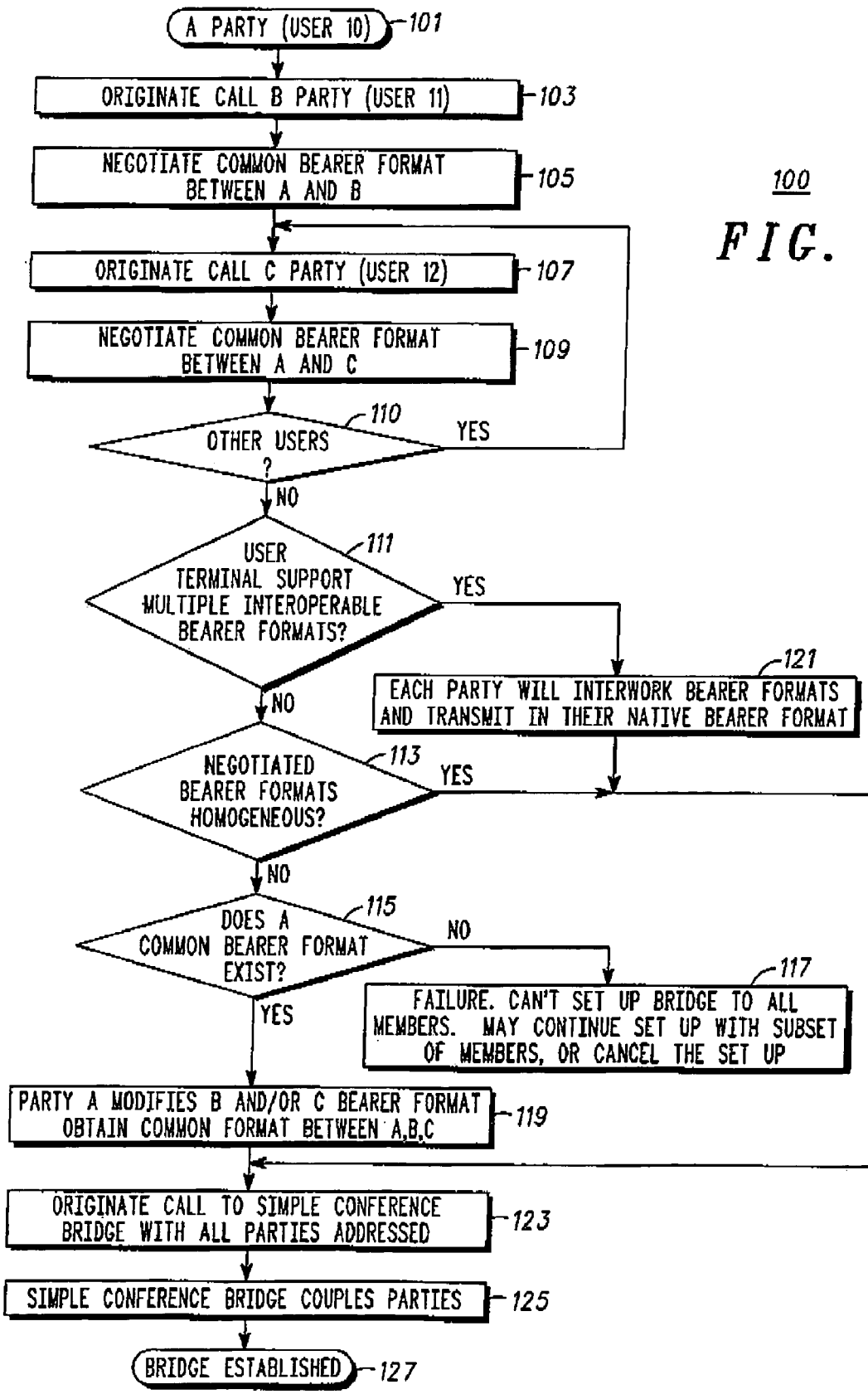
FIGS. 2 and 3 are a flow chart of a call origination and set up in accordance with the present invention.
Figure 3:
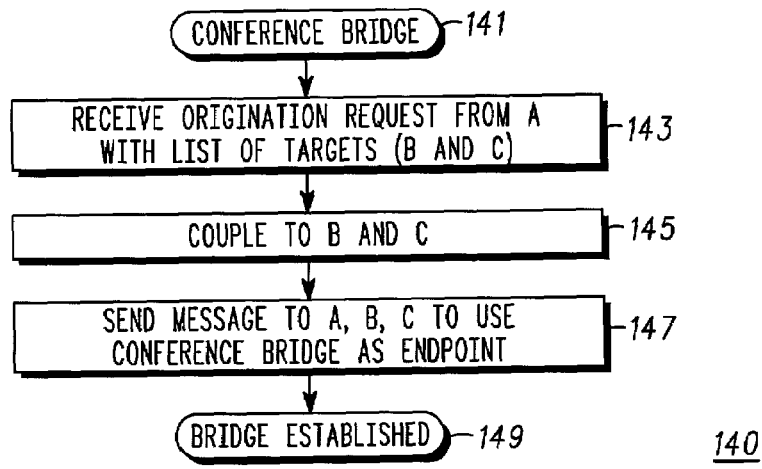

Referring to FIGS. 2 and 3, a call origination 100 conference call arrangement of FIG. 1 is shown. Party A (user terminal 10) is to enter into a conference call, block 101. Party A originates a call via internet interconnection 41 to party B (user terminal 11), block 103. Next, block 105 determines a common bearer format (codec) between parties A and B. A call is then originated to user terminal 12 via internet interconnection 42, block 107.

Next, block 109 negotiates a bearer format between party A and party C (user terminal 12), block 109. An attempt is made to negotiate the same bearer format (codec) as was negotiated between parties A and C. Block 110 determines whether there are any other user terminals (parties) to be interconnected to the conference call. If there are other parties to be coupled, then block 110 transfers control to block 107 via the YES path for repeating the processes of blocks 107 and 109 with a new party to be coupled to the contrence call. If no other user terminals (parties) are to be coupled to the conference call, then block 110 transfers control to block 111 via the NO path.

Next, block 111 determines whether the user terminal support multiple interoperable bearer formats. If each of the user terminals supports multiple bearer formats, control is transferred from block 111 to block 121 via the YES path. Block 121 indicates to each of the user terminals that each of the user terminals will transmit and receive in their own native bearer format.

If each of the user terminals will not support multiple bearer formats, block 111 transfers control to block 113 via the NO path. Block 113 determines whether the bearer formats which were negotiated are homogeneous. If the negotiated formats are homogeneous, block 113 transfers control to block 123 via the YES path. This indicates that there is a LCD codec for use by each of the parties. If the negotiated formats are not homogeneous, block 113 transfers control to block 115 via the NO path.

Block 115 determines whether any common bearer format exists among each of the parties or users. If no common format exists, there is a failure and the conference call bridge may not be set up to all members, block 115 transfers control to block 117 via the NO path. The conference call bridge may continue to set up for a subset of the initial parties or cancel the setup completely, block 117. If a common bearer format exists, block 115 transfers control to block 119 via the YES path. Block 119 modifies A, B, C, etc. bearer formats to obtain a common bearer format between the parties in the conference call. Then block 119 transfers control to block 123.

Block 123 originates call to conference bridge 30 with all the parties or users being addressed. The conference bridge establishes the data path communications via conference bridge 30 and controller 32, block 125. The bridge for conference calling is then established, block 127.

In response to the call origination process 100, conference bridge executes, block 125, the following setup procedure, block 140, beginning at block 141.

For example, the conference bridge 30 receives the origination request from party A with a list of targets to connect to the conference call of parties B and C, block 143. Block 145 originates the data hook up to parties B and C.

Conference bridge 30 sends a message to parties A, B and C (user terminals 10, 11 and 12) via internet interconnections 44, 54 and 64 to use the conference bridge as an end point for the voice packet data transmissions, block 147. The conference bridge is then an established block 149 and procedure 140 is ended. The user terminals update their states to reflect that the conference bridge is now the bearer endpoint, instead of the user terminals. The conference bridge is established and procedure 100 is also ended, block 127.

Figure 4:
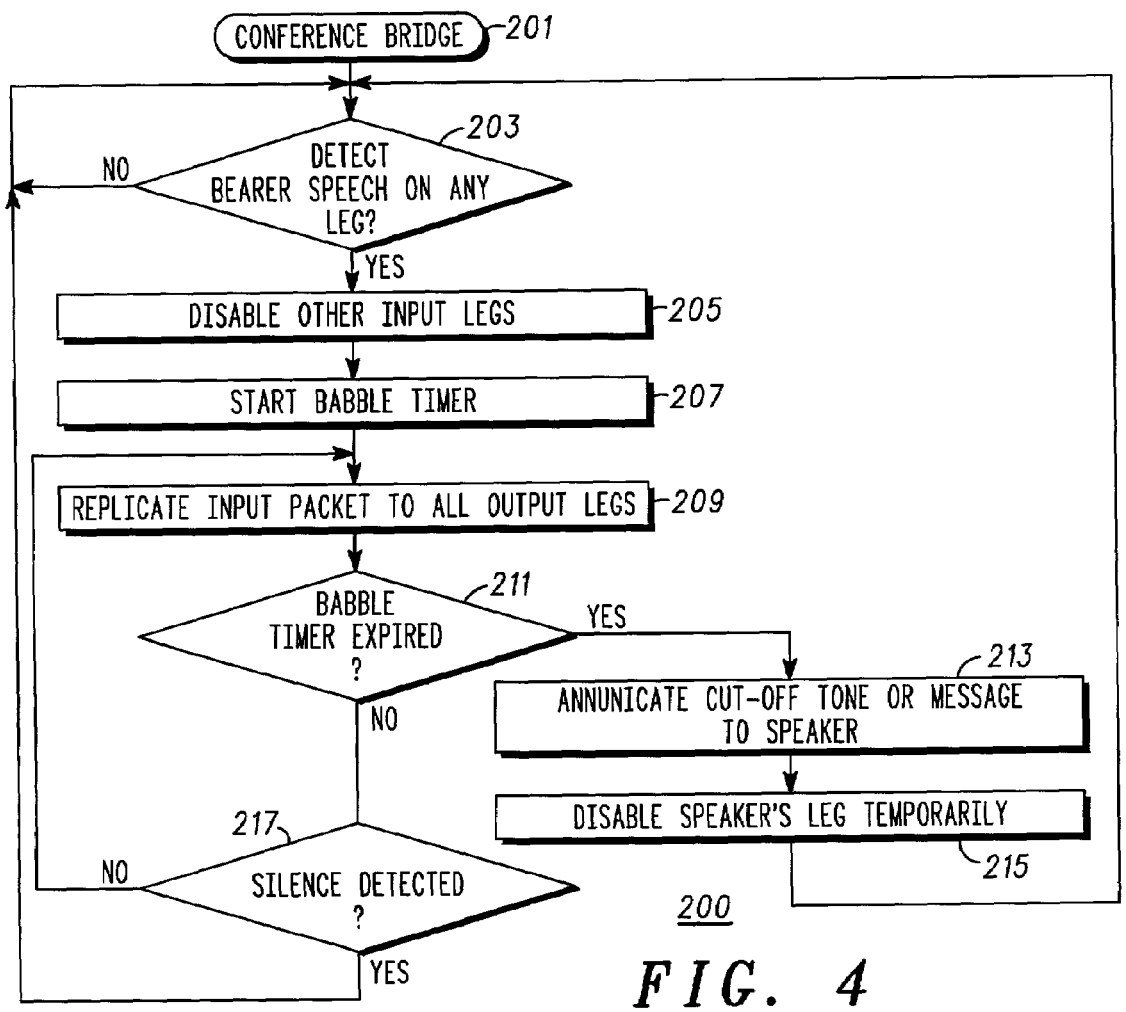
FIG. 4 is a flow chart of the token passing arrangement in accordance with the present invention.

Turning now to FIG. 4, a flow chart of a "token" or control passing arrangement is shown. Once the conference bridge is established, control of speech is passed among the users via their user terminals. The real time protocol (RTP) is a protocol used for carrying the bearer traffic, and is associated with the session initiation protocol (SIP). SIP negotiates the kind of bearer/payloads to be transported in the RTP packets. There is a particular indicator in the header of the RTP voice packet which designates the voice packet as a packet with silence. This indicator is readily ascertainable without examining each bit of the voice sample in the packet.

While in a conference bridge arrangement block 201, the controller of the conference bridge detects if there is speech on any "leg" or input of the conference bridge, block 203. That is, the conference bridge detects the first user terminal to provide a speech or voice input. If no speech input is detected, block 203 transfers control again to make the detection by transferring control to itself via the NO path. Silence is the lack of speech. Silence may be detected by an indicator in the header of the voice packet or by sampling the data of the packet itself. When speech is detected, block 203 will transfer control to block 205 via the YES path.

Block 205 will disable the other inputs ("legs") of the conference bridge from providing any input to the conference bridge. That is, the first speaker will seize control of the conference and other speakers will be disabled from having their voice transferred to each of the users in the conference call. Only one speaker will speak at a given time.

The next block 207 initiates a "babble" timer. A babble timer is a timer set to prevent one speaker on the conference call from tying up and monopolizing the conference forever from ("babbling") or if a noisy background causes the user terminal to never generate the silence packets, thereby monopolizing the conference bridge. The intent of the babble timer is to force the passage of control or token passing of the right to speak to another caller in the conference call at a predetermined time. The term "babble" is to prevent one speaker from babbling on forever, to prevent the noisy environment from never allowing silence packets to be generated.

The next block 209 takes the input voice packet and replicates it for transmission to each of the legs or inputs of the conference call. That is, each caller in the conference call, including the speaker, receives back the voice packets input from the speaking party including the speaking party.

Next, a determination is made as to whether the "babble" timer has expired, block 211. This indicates that one speaker has monopolized the conference call and it is time to pass the control or token to another speaker in the conference call who may be initiating speech (trying to speak). If the babble timer has expired, block 211 transfers control to block 213 via the YES path. Block 213 enunciates a cut off tone or message to the present speaker so that the speaker will be aware that he is temporarily losing control of the token or control of the conference call. This means that the speaker is being forced to relinquish his ability to speak to the others in the conference call in an uninterrupted fashion.

Block 215 disables the present speaker's input leg temporarily. This is so that the other input legs may be examined for speech and a determination of passing control or the token to another speaker may be made. Block 215 then transfers control to block 203 which detects bearer speech on an input leg, except for the disabled past speaker's input. If speech is not detected after a predetermined number of times of checking by block 203, the past speaker's input will be re-enabled and he will again be able to seize the token or control of the conference call. The reader is reminded that speech is quite slow compared to today's real time processing capabilities and that the checks made by the conferencing bridge method 200 are done in fractions of a second so that the speaker who is disabled temporarily may not even know that he has been temporarily disabled from speaking. If block 203 detects speech of another speaker, the steps of blocks 205, 207, 209, 211 and 217 are then performed.

If the babble timer has not expired, block 211 transfers control to block 217 via the NO path. Block 217 detects silence. Silence in a real time protocol SIP configuration is indicated by a particular setting in the header of each packet of speech information. Also, silence may be detected by examining the actual input stream which would be coded to indicate silence. The latter solution requires considerable real time processing power. If silence is detected, block 217 transfers control to block 203 via the NO path which indicates that the past speaker has relinquished the token and the conference bridge is waiting to detect a new speaker by block 203. When this happens, each of the above mentioned steps is again repeated. If silence is not detected, block 217 transfers control to block 209 which replicates the input packet to all the output legs (user terminals) of the conference call. This means that the present speaker has not relinquished control and the timer has not indicated to him to release control and he is continuing to talk with his voice packets of information being distributed to each of the conference callers including himself.

In the token or control passing arrangement 200, token control is simplified by examining the header of the real time protocol to determine a data packet of silence in the preferred embodiment. This greatly simplifies the processing capability required for the conference call and such conferencing circuitry may be employed in a user terminal or even in a mobile handset. In an alternate embodiment, each data packet may be examined for the voice coded silence (as well as noise detection to determine "babble" or a noisy environment). This embodiment requires considerably more real time processing power.

Figure 5:
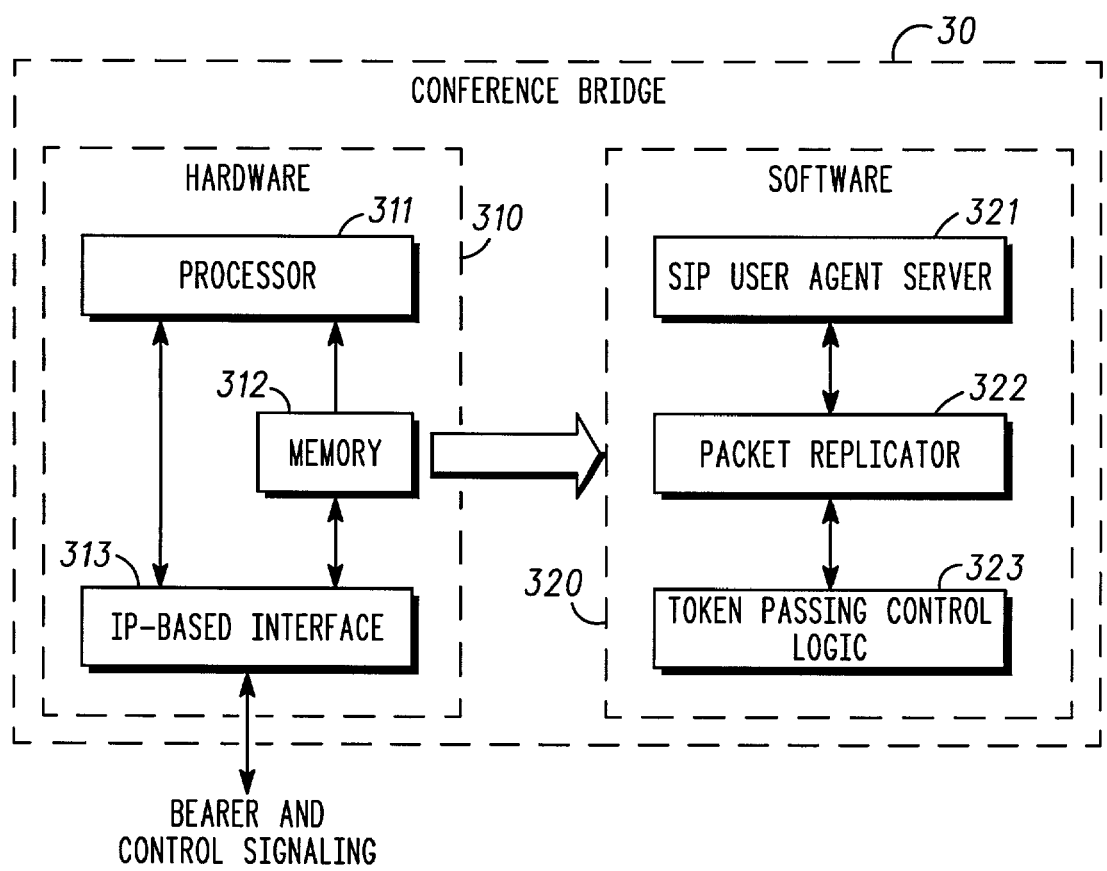
FIG. 5 is a block diagram of the conference bridge in accordance with the present invention.

FIG. 5 depicts a block diagram of the conference bridge 30. Hardware 310 includes a processor 311 interconnected with memory 312 and internet protocol based interface 313. Memory 312 is also interconnected with IP based interface 313. IP based interface 313 provides the bearer traffic and control signaling inputs and outputs mentioned above.

The software 320 of the conference bridge includes SIP user agent server 321 which is interconnected to packet replicator 322. Packet replicator 322 is interconnected with the token passing control logic 323 which is shown in FIG. 4. The SIP user agent server software 321 is depicted in FIGS. 1–3 discussed above. Packet replicator 322 is believed well known in the art and will not be discussed further. Token passing control logic 323 was previously described in FIG. 4. These various functions interact as discussed above to provide the conference bridge arrangement of the present invention.

New wire line cable and DSL infrastructure is being positioned to support voice along with data. In addition, third generation mobile networks are currently being developed. Much of the new infrastructures use internet protocol technology which enables voice over internet protocol services to be supplied. The present invention leverages off of session initiation protocol applicable to such voice over internet protocol capabilities to provide a conference bridge in accordance with the above description. The present invention simplifies the way in which conference calling can work in a voice over internet protocol environment. The present conference bridge arrangement allows negotiation of codecs directly between each of the participants in a conference call. This negotiation occurs over the internet which allows each user to be found regardless of whether he is at his typical location or is in a mobile location. This eliminates the need for complex conversions and vocoding to occur at the central conference bridge. The conference bridge is greatly simplified to be a basically packet replicator and distributor. This greatly simplifies the requirements for conference bridges located within telephone operating companies or conference facilitator providers.

The conference bridge is removed from handling the set up of the conference call and handles just the transmission of bearer traffic between the conference call participants. Conventional conference arrangements require the conference bridge to include virtually every conceivable codec for information interchange among varied users. In addition, the conference bridge needs to include much processing power in the form of digital signal processors to implement conversion, mixing and revocoding functions required. The present invention eliminates all such functional requirements in the conference bridge by having the user terminals themselves negotiate a compatible codec (bearer format) with the other user terminals in the conference call. Suitably equipped user terminals including remote terminals may perform the conference bridge function directly.

The token control arrangement leverages off of the real time protocol (RTP) to quickly detect silence for passing the token to another caller in the conference. In addition, the token passing arrangement allows for cutting off the speaker who is monopolizing the conference call. The control for such token passing arrangements may reside even in the user terminal of one of the conference callers.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. A token control method for an internet conference call among a plurality of user terminals, the token control method comprising the steps of:
   detecting bearer traffic from a real time protocol of a first user terminal of the plurality of user terminals;
   detecting silence from the real time protocol of data packets being transmitted by the first user terminal of the plurality of user terminals, a portion of at least one of the data packets in real time protocol indicating silence, wherein the step of detecting silence includes the step of detecting an indication of silence from a header of at least one of the data packets in real time protocol; and
   if the step of detecting silence is successful, detecting bearer traffic from the real time protocol of a second user terminal of the plurality of user terminals.

2. The token control method as claimed in claim 1, wherein if the step of detecting silence is successful, there is further included the step of detecting bearer traffic from the real time protocol of a second user terminal of the plurality of user terminals.

3. A token control method for an internet conference call among a plurality of user terminals, the token control method comprising the steps of:
   detecting bearer traffic from a real time protocol of a first user terminal of the plurality of user terminals;
   detecting silence from the real time protocol of data packets being transmitted by the first user terminal of the plurality of user terminals, a portion of at least one of the data packets in real time protocol indicating silence;
   if the step of detecting silence is successful, detecting bearer traffic from the real time protocol of a second user terminal of the plurality of user terminals; and
   disabling an input of each of another of the plurality of user terminals when bearer traffic is detected from the first user terminal of the plurality of user terminals.

4. A token control method for an internet conference call among a plurality of user terminals, the token control method comprising the steps of:
   detecting bearer traffic from a real time protocol of a first user terminal of the plurality of user terminals;
   detecting silence from the real time protocol of data packets being transmitted by the first user terminal of the plurality of user terminals, a portion of at least one of the data packets in real time protocol indicating silence; and
   if the step of detecting silence is successful, detecting bearer traffic from the real time protocol of a second user terminal of the plurality of user terminals; and
   starting a timer for the first user terminal to measure a length of time the first user terminal continuously speaks.

5. The token control method as claimed in claim 4, wherein there is further included the step of examining the timer for determining whether the length of time has exceeded a predetermined length of time for continuous speaking by the first user terminal.

6. The token control method as claimed in claim 5, wherein there is further included the step of annunciating a cut-off tone to said first user terminal, if the timer exceeded its predetermined length of time.

7. The token control method as claimed in claim 5, wherein there is further included the step of temporarily disabling an input of said first user terminal, if the timer exceeded its predetermined length of time.

8. The token control method as claimed in claim 7, wherein there is further included the steps of:
   detecting bearer traffic from the real time protocol of the second user terminal of the plurality of user terminals; and
   enabling the input of the first user terminal.

9. The token control method as claimed in claim 8, wherein there is further included the step of iterating the steps of: detecting bearer traffic; detecting silence from a real time protocol of data packets; and if the step of detecting silence is successful, detecting bearer traffic for the second user terminal.

10. The token control method as claimed in claim 8, wherein there is further included the step of replicating the data packets of the second user terminal for transmission to each of the plurality of user terminals.

11. In a user terminal a token control method for an internet conference call among a plurality of user terminals, the token control method comprising the steps of:
    detecting bearer traffic from a real time protocol transmitted by a first user terminal of the plurality of user terminals;
    detecting silence from the real time protocol of data packets being transmitted by the first user terminal of the plurality of user terminals, a portion of at least one of the data packets in real time protocol indicating silence, wherein the step of detecting silence includes the step of detecting an indication of silence from a header of at least one of the data packets in real time protocol; and
    if the step of detecting silence is successful, detecting bearer traffic from the real time protocol of a second user terminal by the first user terminal of the plurality of user terminals.

12. In a first mobile user terminal a token control method for an internet conference call among a plurality of user terminals comprising mobile user terminals, the token control method comprising the steps of:
    detecting bearer traffic transmitted by a first mobile user terminal of the plurality of user terminals;
    detecting silence from a real time protocol of data packets being transmitted by the second mobile user terminal of the plurality of user terminals, a portion of at least one of the data packets in real time protocol indicating silence; and
    if the step of detecting silence is successful, detecting bearer traffic from the real time protocol of a second mobile user terminal by the first mobile user terminal of the plurality of user terminals.

* * * * *